Figure 1:
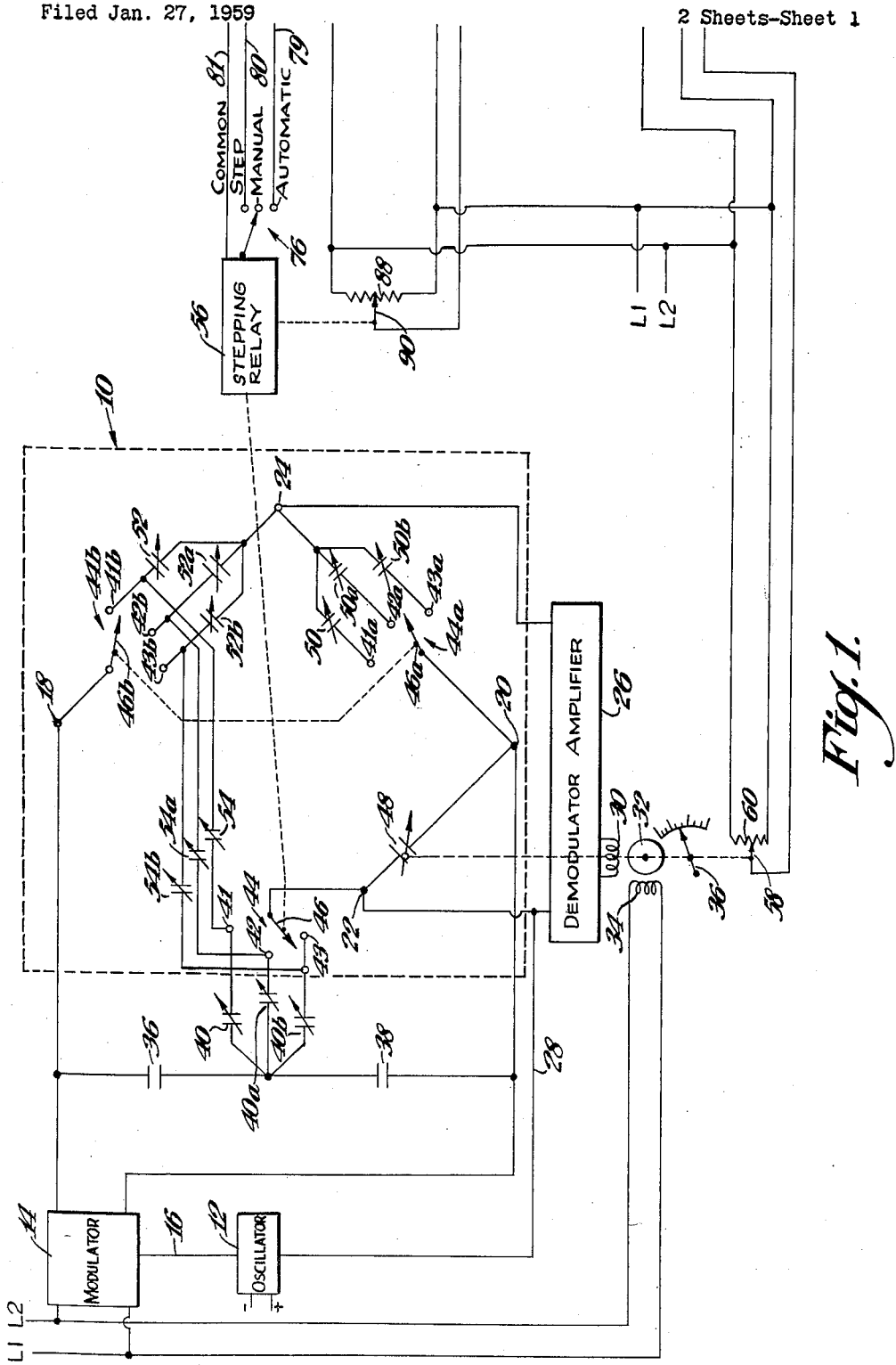

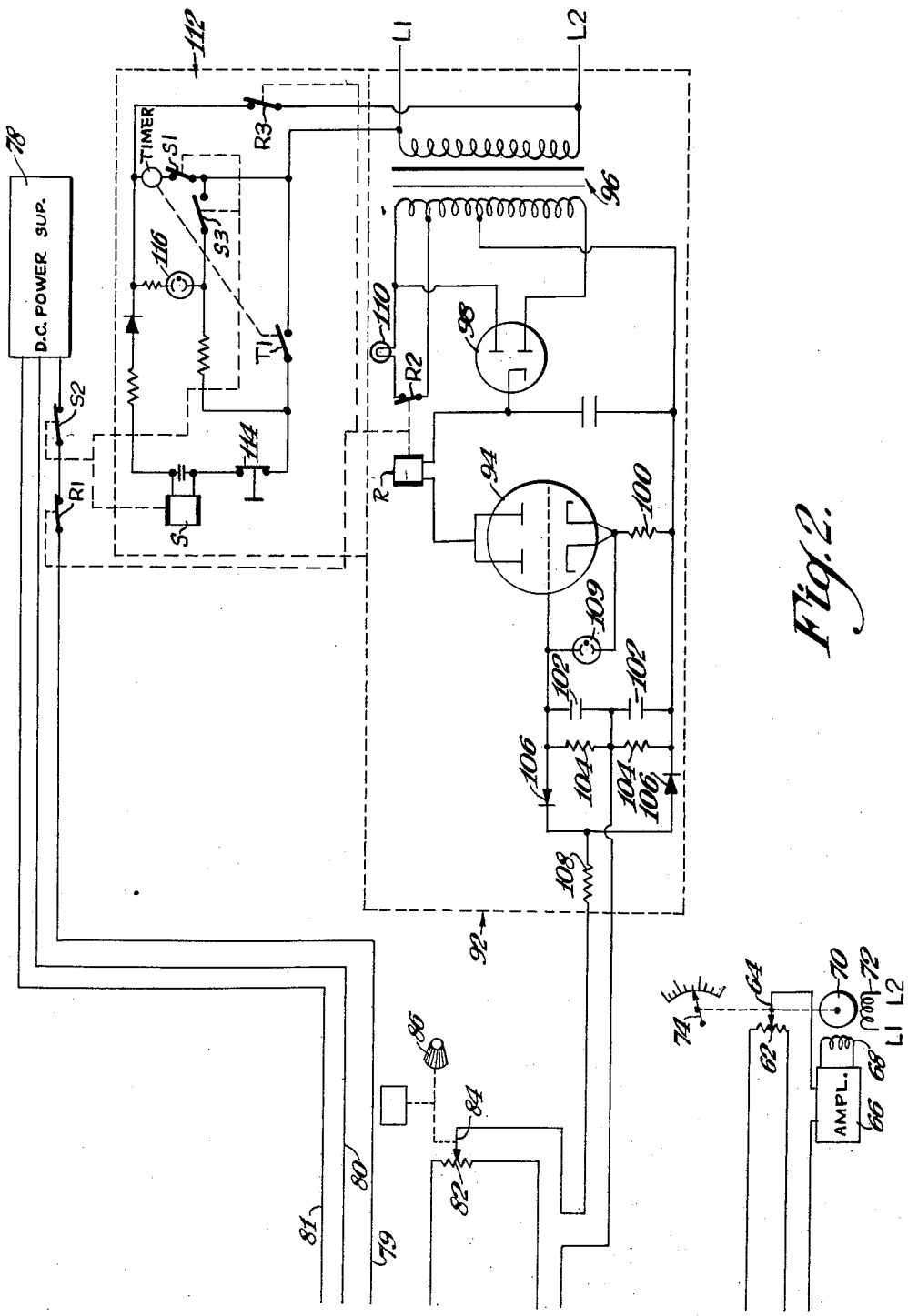

United States Patent Office 3,077,588
Patented Feb. 12, 1963

3,077,588
MULTI-POINT NULL-BALANCE BRIDGE SYSTEM
George Revesz, Cheltenham, and Morton Sklaroff and Engils H. Evalds, Philadelphia, Pa., assignors to Robertshaw-Fulton Controls Company, Richmond, Va., a corporation of Delaware
Filed Jan. 27, 1959, Ser. No. 789,355
9 Claims. (Cl. 340—182)

This invention relates generally to electrical measuring apparatus and more particularly to apparatus of this nature for selectively measuring and/or controlling the condition of a group of variables.

In industrial processes, it is necessary to frequently monitor a large number of controlled variables and to determine and indicate the amount by which these variables depart from predetermined datum levels. Such monitoring is usually accomplished by individual sensor and control units, but when the individual variables are separated by considerable distances, it becomes economically desirable and often necessary to perform this monitoring from a point which is more or less centrally located relative to the group of variables.

Additionally, when the group of variables become unyieldingly large and/or become separated by such vast distances as to render a central point impractical or undesirable, economics and practicality dictate splitting the group of variables into several groups, each of which may be monitored from a central point thereto and then controlling the several central monitoring points from some convenient location.

The present invention contemplates a system for monitoring the condition of the plurality of variables from a central location and additionally contemplates supervision of the central monitoring location from a point remote thereto.

Accordingly, then, an object of this invention is to selectively monitor a plurality of variables from a remote location.

Another object of this invention is to supervise the mode of operation of an apparatus for monitoring and/or controlling the condition of a plurality of variables.

Another object of this invention is to selectively connect any one of a plurality of impedance elements to a measuring apparatus and derive therefrom error signals representative of deviations in the impedance elements from preselected standards.

Still another object of this invention is to transmit error signals representative of deviations in a variable to remote indicating means.

A further object of this invention is to supervise the mode of operation of a means for monitoring and/or controlling the condition of a plurality of variables and to indicate the condition of the plurality of variables at a point remote to the monitoring and/or controlling means.

The preferred embodiment of this invention may utilize a plurality of impedance bridges which respectively correspond to each of a plurality of variables to be monitored and/or controlled and which are responsive to variations therein. Switching apparatus, operative between positions, may be connected to the plurality of impedance bridges for selectively connecting any one of the plurality of impedance bridges to an indicating means and may be operated by a stepping apparatus operatively connected thereto. A first variable voltage dividing means is provided at the plurality of impedance bridges and with a sliding contact driven by the stepping apparatus to pick off a voltage which is analogous to the position of the switching apparatus.

A second variable voltage dividing means is operatively connected to the first variable voltage dividing means and located remote thereto at a controlling location and includes a sliding contact movable to pick off a voltage analogous to any desired position of the switching apparatus. Means located at the controlling location are operatively connected to the sliding contacts on the first and second variable voltage dividing means and responsive to error signals derived therefrom for energizing the stepping apparatus.

These and other objects and advantages of the present invention will become apparent from the following description taken in connection with the accompanying drawing wherein:

FIG. 1 is a schematic view of the measuring system of the present invention; and FIG. 2 is a schematic view of the remote controlling system of the present invention.

Referring more particularly to FIG. 1 of the drawing, there is shown an impedance bridge 10, which may be reconnected in various ways to form a plurality of impedance bridges. Bridge 10 may be energized in any manner well known in the art. To this end, the input to bridge 10 is derived from an RF oscillator 12, connected to a suitable D.C. source, and from a modulator 14, connected to line wires L1, L2 of a suitable 60 cycle source of power. Oscillator 12 is connected to the modulator 14 by a wire 16 and the signal therefrom is amplified and modulated at a 60 cycle rate in the modulator 14 and then applied to input terminals 18, 20 of the bridge 10.

Output terminals 22, 24 of the bridge 10 are connected to a demodulator-amplifier 26 and a wire 28 connects oscillator 12 to output terminal 22 thus impressing the RF signal from oscillator 12 upon the signal derived at the output terminals 22, 24 of the bridge 10. This composite signal is then demodulated in the demodulator portion of demodulator-amplifier 26 to yield a 60 cycle signal, which is in phase and amplitude, dependent upon the degree and direction of unbalance in the bridge 10. The signal derived from the demodulator portion of demodulator-amplifier 26 is then amplified in the amplifier portion thereof and applied to a control winding 30 of a motor 32, which has a power winding 34 connected to the line wires L1, L2 of the 60 cycle source. Motor 32 is a two-phase motor of a well known type which rotates in one direction or the opposite direction dependent upon the direction of current flow in the output terminals 22, 24 of the bridge 10. The motor 32 may be mechanically coupled to a suitable indicator 36 for indicating the amount and direction of unbalance in the bridge 10.

Means are provided for adjusting the span of the bridge 10 independently of the zero adjustment therefor and comprise a pair of substantially identical capacitors 36, 38 connected in series across the input terminals 18, 20. One of the plates of a plurality of variable capacitors 40, 40a, 40b is in each case connected to a point intermediate the capacitors 36, 38 and the other of the plates of capacitors 40, 40a, 40b is connected to contacts 41, 42, 43 respectively of a scanning switch 44. Scanning switch 44 is provided with a rotatably disposed wiper 46, which is mounted to engage the contacts 41, 42, 43 and which is connected to output terminal 22 of the bridge 10.

A first arm of the bridge 10 comprises a capacitor 48 connected between output terminal 22 and input terminal 20. A second arm of the bridge 10 is connected between input terminal 20 and output terminal 24 and comprises a scanning switch 44a which is identical to scanning switch 44 and which has a wiper 46a mounted to engage contacts 41a, 42a, 43a thereof. Wiper 46a is connected to input terminal 20 and contacts 41a, 42a, 43a are connected to one of the plates of a plurality of variable capacitors 50, 50a, 50b, respectively. The other plates of variable capacitors 50, 50a, 50b are connected to output terminal 24.

A third arm of the bridge 10 comprises a plurality of variable capacitors 52, 52a, 52b and a scanning switch 44b connected between input terminal 18 and output terminal 24. Scanning switch 44b is identical to scanning switch 44 and includes a rotatable wiper 46b connected to input terminal 18 and a plurality of contacts 41b, 42b, 43b cooperable therewith. Corresponding plates of capacitors 52, 52a, 52b are connected to contacts 41b, 42b, 43b, respectively, and the opposite plates thereof are connected to output terminal 24. A plurality of variable capacitors 54, 54a, 54b are connected intermediate contacts 41 and 41b, 42 and 42b, and 43 and 43b, respectively, to form the fourth arm of the bridge 10.

The wiper arms 46, 46a, 46b of the scanning switches are ganged together for simultaneous movement by a stepping apparatus 56, which will be described more fully hereinafter. Thus, if wiper arms 46, 46a, 46b are moved to engage contacts 41, 41a, 41b, respectively, it is apparent that capacitors 48, 50, 52, 54 are connected together to form the four impedance arms of the bridge 10. Simultaneously therewith, switch 44 connects the span adjusting means comprising the capacitors 36, 38, 40 to the bridge thus formed. If the wiper arms are moved to engage contacts 42, 42a, 42b, the capacitors 48, 50a, 52a, 54a, form the four impedance arms of the bridge 10 with a span adjusting means, comprising the capacitors 36, 38, 40a connected thereto. Finally, if the wiper arms 46, 46a, 46b are moved to engage contacts 43, 43a, 43b respectively, the capacitors 48, 50b, 52b, 54b form the four impedance arms of the bridge 10, with span adjusting means comprising the capacitors 36, 38, 40b connected thereto.

The capacitors 52, 52a, 52b and 54, 54a, 54b provide means for adjusting zero settings whereas the capacitors 50, 50a, 50b are the sensing elements and are adapted to be responsive to variations in the variables to be monitored and/or controlled and are accordingly located at the respective variables. Thus, by operation of the scanning switches 44, 44a, 44b the bridge 10 may be reconnected in a manner to form a plurality of impedance bridges, each of which have their own independent zero setting, sensing and span adjusting components suitably calibrated to respond to variations in a particular variable.

Capacitor 48, which is common to each of the bridges thus formed, may be a variable component and the motor 32 may be mechanically coupled thereto. Thus, the motor 32, in response to a signal at terminals 22, 24 may be further utilized to vary capacitor 48 and rebalance the particular components which at that instant form the bridge 10.

The motor 32 may also actuate an indicating system and to this end is shown as being mechanically coupled to a sliding contact 58 of a transmitting potentiometer 60. The ends of transmitting potentiometer 60 are connected to the ends of a repeating potentiometer 62 which is provided with a slider contact 64 and which is located at the remote controlling location. A suitable source of alternating circuit potential L1, L2 is connected across the ends of the potentiometers 60, 62 and the sliding contacts 58, 64 may be connected together in circuit with an amplifier 66. Signals derived from amplifier 66 are applied to a control winding 68 of a two-phase reversible motor 70 which has a power winding 72 connected to line wires L1, L2 of a suitable source of alternating current potential. Motor 70 may be similar to motor 32 and may be connected to the sliding contact 64 and to a suitable indicator 74, which is a duplicate of previously mentioned indicator 36, at the measuring location.

The balance of the indicating system is obtained by the rotation of the motor 70 into the position in which the input voltage to the amplifier 66 becomes zero. This means that at balance the voltage between the bottom terminal of potentiometer 60 and sliding contact 58 must be equal to the voltage between the bottom terminal of potentiometer 62 and sliding contact 64. When the apparatus is unbalanced, the motor 70 is actuated by the amplifier 66 as is necessary to adjust the sliding contact 64 to a position to cause the last mentioned voltage drops to become equal and hence to bring the apparatus to its balanced condition.

Since the position of motor 32 is indicative of the unbalance in bridge 10, it is apparent that the position of sliding contact 58 along potentiometer 60 is also indicative of this unbalance. Thus, the position of sliding contact 64 along the potentiometer 62 in a balanced condition is also indicative of the extent of unbalance in bridge 10 and the cooperation between motor 70 and indicator 74 provides an indication of the measured unbalance of the bridge 10 at any time.

Stepping apparatus 56 may conveniently be of a type to continuously advance wiper arms 46, 46a, 46b from contact to contact so long as it remains energized. A selector switch 76 having "step," "manual" and "automatic" positions is provided for selecting the manner of energization of the stepping apparatus 56. Although local and remote energization may conveniently be provided for stepping apparatus 56, only the remote energization circuitry is shown and described herein. To this end, a suitable power supply 78, at the remote controlling location, is shown connected to the "automatic" and "step" positions of the switch 76 and to the stepping apparatus 56 by a plurality of conductors 79, 80, 81, respectively.

Switch 76 may be a type to disconnect stepping apparatus 56 from the source of power 78 whenever it is placed in the "manual" position and to momentarily energize stepping apparatus 56 to advance the switch arms 46, 46a, 46b one positon each time that it is moved from the "manual" position to the "step" position. When switch 76 is actuated to the "automatic" position, stepping apparatus 56 will be continuously energized and will advance the switch arms 46, 46a, 46b continuously.

Means are provided at the remote controlling location for initiating and controlling operation of the stepping apparatus 56 whenever switch 76 is in the "automatic" position. A potentiometer 82 is provided at the remote controlling location and has a sliding contact 84 cooperable therewith and movable by an operating knob 86. Operating knob 86 may be suitably calibrated in terms of the position of switch arms 46, 46a, and 46b. A similar potentiometer 88 is provided at stepping apparatus 56 and has a sliding contact 90 movable thereby. A source of alternating current potential L1, L2 is connected across the potentiometers 82, 88 and sliding contacts 84, 90 are connected to a stepping control unit, indicated generally at 92, which is responsive to error signals or differences of potential therebetween.

Stepping control unit 92 includes a conventional electron discharge device, such as duotriode 94, energized in a conventional manner from a suitable source of alternating current potential L1, L2 through a transformer 96 and a full wave rectifier tube 98. The cathodes of tube 94 are connected together and to ground potential through a cathode resistor 100. The anodes of tube 94 are connected together and to B-plus potential through a relay operating coil R. Relay coil R is mounted to control three pairs of normally closed contacts R1, R2, R3, the operation of which will be described more fully hereinafter.

A pair of serially connected capacitors 102, 102 are connected between the control grid of tube 94 and ground potential. A pair of serially connected resistors 104, 104 are connected between the grid of tube 94 and ground potential in parallel with the serially connected capacitors 102, 102. A pair of serially connected diodes 106, 106, poled in the same direction with respect to grid voltage, are serially connected in parallel across the parallel circuit comprising the resistors 104, 104 and capacitors 102, 102. Sliding contact 84 is connected through a dropping resistor 108 to a point intermediate the pair of diodes 106, 106 and sliding contact 90 is connected to a point intermediate the resistors 104, 104 and capacitors 102, 102. Thus, the control grid of tube 94 will be impressed with a potential for biasing tube 94 to cut-off whenever a difference in potential, irrespective of its polarity, exists between sliding contacts 84 and 90.

With switch 76 in the "automatic" position and upon rotation of knob 86 to a preselected position, a difference in potential will exist between sliding contacts 84 and 90 and tube 94 will be biased to cut-off. Relay coil R will remain deenergized and the pair of contacts R1, disposed in wire 79, will remain closed to apply an operating potential from power supply 78 to stepping apparatus 56. Stepping apparatus 56 will actuate sliding contact 90 to the position selected by knob 86 and, at this point, there will be no difference of potential between sliding contacts 84 and 90 and the biasing potential will be removed from the grid of tube 94. Tube 94 will conduct when the biasing potential is removed to energize relay coil R and open the pair of contacts R1, thereby disconnecting power supply 78 from stepping apparatus 56. Stepping apparatus 56, upon energization thereof, will also actuate the switch arms 46, 46a, 46b to the position selected by knob 86 to perform the measuring and indicating operation heretofore described.

Should any of the components in stepping control unit 92 fail during operation, relay coil R will become deenergized thus allowing stepping apparatus 56 to remain energized. Erroneous selection of the sensing elements 50, 50a, or 50b is thus precluded. A neon bulb 109 may be conveniently connected between grid and cathode of tube 94 to prevent damage thereto if the potential difference between sliding contacts 84, 90 becomes excessive.

A visual indicating means, such as bulb 110, may be connected across a suitable source of electric power, shown to be a tapped connection on the secondary of transformer 96, and in series with the normally closed pair of contacts R2 to indicate that stepping apparatus 56 is energized to select a sensing element. Prolonged energization of the bulb 110 will indicate that stepping apparatus 56 has failed to select the sensing element corresponding to the position of knob 86.

Means are also provided to prevent prolonged operation of the stepping apparatus 56, and comprises the timing apparatus indicated generally at 112. Timing apparatus 112 includes a timing device T of a well known type which actuates a normally open timing contact T1 to a closed position upon being energized for a preselected period of time. A relay coil S is connected in series with the normally closed pair of contacts R3, normally opened timing contact T1, a normally closed manually operable pushbutton operator 114 and across the source of power L1, L2. Relay coil S is mounted to actuate two pairs of normally closed contacts S1, S2 and a pair of normally open contacts S3. The normally closed pair of contacts S2 are disposed in the wire 79 connecting power supply 78 to the "automatic" position of switch 76. The normally closed pair of contacts S1 and the normally closed pair of contacts R3 connect the timing device T across the source of power L1, L2. The normally open pair of contacts S3 are connected across the timer contact T1 and an indicating bulb 116 may be connected across timing device T to indicate the actuation thereof in response to prolonged use of stepping apparatus 56.

When relay coil R is deenergized, as when a potential difference appears between the sliding contacts 84 and 90, it should be apparent that timing device T is energized from the source of alternating current potential L1, L2 through the pairs of normally closed contacts S1 and R3. If stepping apparatus 56 properly selects the sensing element 50, 50a, or 50b as predetermined by the knob 86, relay coil R will become energized, thereby deenergizing timing device T upon the opening of the pair of contacts R3. If, however, stepping apparatus 56 fails to select the proper sensing element 50, 50a, or 50b within the period of time determined by the characteristics of the timing device T, then timing device T will actuate contact T1 to a closed position to energize the relay coil S. Upon energization of relay coil S, the pair of contacts S2 will disconnect power supply 78 from the "automatic" position of switch 76 to deenergize stepping apparatus 56; the pair of contacts S1 will disconnect the timing device T from the source of power L1, L2, and the pair of contacts S3 will be actuated to a closed position to latch in the relay coil S.

Upon the closure of the pair of contacts S3, indicating bulb 116 will be energized from the source of power L1, L2 to indicate that timing device T has been actuated in response to prolonged use of stepping apparatus 56. The relay coil R is naturally deenergized and thus the indicating light 110 is also energized. Thus, an operator, upon visual inspection of the indicating lamps 110 and 116, will be advised of the inoperativeness or malfunctioning of some of the components in the system. Manual operator 114 can thereafter be actuated to disconnect relay coil S from the source of power L1, L2 to reset the timing apparatus 112.

It will be apparent to those skilled in the art that changes may be made in the form of the apparatus disclosed without departing from the invention as defined in the appended claims and that in some cases, certain features of the invention may be used to advantage without a corresponding use of the other features.

We claim:

1. In a device for monitoring at a remote station a plurality of variable conditions indicated as varying impedances, the combination comprising; an A.C. energized impedance bridge structure including first and second impedance arms each of switchingly selectable value to establish at bridge balance an impedance ratio, said arms being parallel connected for series energization with third and fourth arms, respectively, said third arm switchingly including one of a plurality of impedances each varied by a said condition, said fourth arm being a single impedance adjustably variable to balance said bridge according to said ratio determined by said first and second arms; switch means remotely operable to select in succession corresponding said impedance values in said first, second and third arms, means for adjusting said first and second arm impedance values whereby a single adjustment of said fourth arm represents a bridge balance for each of said plurality of impedances at a predetermined normal value; means including a motor operatively linked to vary said fourth arm impedance in response to unbalance of said bridge and energized to rebalance the bridge; repeating motor means at said station indicating the extent of operation of first said motor to effect said rebalancing; and means at said station for remotely selecting any of said plurality of impedances indicative of conditions, including indicating means to show which thereof is selected, automatic correcting means to continue selecting until said selected impedance is in circuit, and means to indicate when a said selected impedance is not in circuit.

2. In a monitoring device according to claim 1, said selecting means including a stepping switch continuously energized to select successively each of said plurality of impedances and having relay means to terminate said energization, said relay means being actuated in response to coincidence between said stepping switch and a remote position control therefor.

3. In a device for remotely monitoring the condition of a plurality of variables, the combination comprising an impedance bridge structure having four impedance arms, said first impedance arm including a plurality of first impedance elements respectively corresponding to the plurality of variables and being variable in response to variations therein for unbalancing said impedance bridge, said second impedance arm including a plurality of third impedance elements respectively corresponding to said first impedance elements, said third impedance arm including a plurality of third impedance elements respectively corresponding to said first impedance elements, said fourth impedance arm including a variable impedance element, switching apparatus remotely operative to connect in preselected sets said corresponding first, second and third impedance elements to said fourth impedance arm, means operatively connected to said impedance bridge as connected in each said set of elements and responsive to unbalance therein for varying the impedance element in said fourth impedance arm to rebalance said bridge, means remotely indicating which of said first, second and third impedance elements is connected to said fourth arm by said switching apparatus, and means operatively responsive to failure of said apparatus to complete a selected switching operation to indicate incomplete operation thereof.

4. In the device of claim 3, said indicator of incomplete operation including control and remote station indications of switch position, the central station indicator being settable at will, having means registering a difference in indicated position from that at the remote station, having means to continuously operate said switching means as long as said difference is registered, and having means to indicate, after a selected interval, that said difference has not been eliminated.

5. In a device for monitoring at a central station a number of variable conditions at remote stations, the combination comprising a plurality of impedance bridges each including an impedance indicative of a said condition and being unbalanced in response to variations thereof from a design value, means indicating the degree of said unbalance of an instantly connected said bridge, switch means for successively connecting to said indicating means each of said bridges including each of said condition indicative impedances, means at said station to operate said switch means to make said connections, means indicating at said station the failure of said switch means to make said connections, means indicating the failure of last said means to operate, and means at said station repeatingly indicating the said degree of unbalance indicated at the remote station.

6. In the monitoring device of claim 5, said means at said station to operate the switch means including a pair of impedances, one at each station, energized in parallel and having similar variable voltage pick-off arms, connected on to said switch means as an indication of the switch position effected and the other to an indicating circuit at said central station, and means at the central station to continuously actuate said switching means until said voltage pick-off arms indicate similar voltages.

7. In the monitoring system of claim 6, said indicating means including an indicator lamp controlled by the passage of relay current in response to a difference in voltage selected on potentiometer arms rotatively connected to said control dial and said stepping switch when similarly energized.

8. In a monitoring system for centrally indicating the conditions represented by a group of variable impedances, each connectable into a bridge circuit of which one arm is a motor-controlled balancing impedance and each switchably connected to said arm in a balanced impedance bridge therewith at a predetermined value of said condition, stepping switch means connecting a pair of bridge impedance elements to form said balanced bridge for each said variable impedance at said predetermined value, high frequency energizing means for said bridge, bridge unbalance detecting means, motor operating means for said balancing impedance driven in inverse direction and amount to restore said balance in response to a changed value of a said variable impedance, means remotely indicating at said central station the direction and amount of said motor operation, control dial means at said central station for operating said stepping switch, means to connect into said bridge circuit in succession each of said variable impedances, including a continuously powered stepping circuit, means interrupting said stepping circuit whenever said switch has connected the selected said impedance, means responsive to selection failure for maintaining in operation said stepping circuit when said control dial means is not in agreement with the position of the stepping switch, and means for centrally indicating said selection failure.

9. In the monitoring system of claim 8, said indicating means including an indicator lamp energized in response to failure of the stepping switch to follow the control dial means within a predetermined interval.

References Cited in the file of this patent

UNITED STATES PATENTS

| | | |
|---|---|---|
| 2,188,628 | Freystedt | Jan. 30, 1940 |
| 2,333,321 | Leathers | Nov. 2, 1943 |
| 2,466,803 | Giffon | Apr. 12, 1949 |
| 2,790,120 | Ducoff | Apr. 23, 1957 |
| 2,675,510 | Belcher | Apr. 13, 1959 |
| 2,894,246 | Graffenried | July 7, 1959 |
| 2,943,258 | Shawhan | June 28, 1960 |